3,220,900
PROCESS FOR THE MANUFACTURE OF HARD, OR SEMI-HARD, MOLDED BODIES OF WOOD FIBER MATERIAL, PREFERENTIALLY WOOD FIBER BOARDS, HAVING A RESISTANT, COVERING SURFACE
Lars E. F. Ewerbring, Sundsvall, Sweden, assignor, by mesne assignments, to Abitibi Power & Paper Company, Limited, Toronto, Ontario, Canada, a corporation of Canada
No Drawing. Filed Mar. 13, 1961, Ser. No. 94,992
Claims priority, application Sweden, Mar. 14, 1960, 2,525/60
4 Claims. (Cl. 156—62.2)

The present invention relates to a process for the manufacture of hard, or semi-hard, molded bodies of wood fiber material, preferentially wood fiber boards, having a resistant, covering surface and being intended to be used, for example, for joinery and building purposes.

The primary characteristic of the invention resides therein that a fiber sheet having a moisture content of less than 40%, preferentially less than 20%, preferably less than 10%, simultaneously with said sheet being subjected to pressing, in a manner known per se, at a high pressure and in high heat, in order to be formed to its final shape, is united with one or more, relatively thin, highly flexible sheets of some other material than plastic, such sheets being impregnated and/or covered with a binding agent. The fiber sheet preferably consists of a loosely felted fiber mat, obtained by the sedimentation of fibers in air, but it may also consist of a porous fiber board, which, in advance, has been brought to the desired moisture content. The impregnated and/or covered sheet, or sheets, are applied to the fiber sheet, preferably immediately before the fiber sheet is subjected to the final molding treatment, and prior to the application of the impregnated and/or covered sheet, or sheets, it may also be convenient to moisten the fiber board. As an impregnating and/or covering agent for the highly flexible sheet, or sheets, there may be used a plastic, which is hardenable by heat and/or an oil polymerisable by heat and/or derivatives thereof. It is suitable then to add to the oil, polymerisable by heat, and/or the derivative thereof, a substance serving as an extra binder. When using an oil polymerisable by heat, and/or derivatives thereof, it has proved particularly advantageous to use the same in an emulsified state. As examples of hardenable plastics that may be used for impregnating and/or covering the highly flexible sheet, or sheets, there may be mentioned urea-formaldehyde resin and melamine-formaldehyde resin, which are to be preferred, but also phenol-formaldehyde resins and polymerisable low pressure resins may be used. As oils polymerisable by heat and/or derivatives thereof it is advantageous to use linseed oil and oils of the linseed oil type, such as chinawood oil and soya oil, and tall oils esterified with polyalcohols, tall oil derivatives, castor-oil alkyds and several others.

As a carrier for the resin, the oil or the oil derivative paper usually is the most suitable material to use, but also textiles and other materials may be used. The carrier may, of course, be provided with a color or a pattern, and several layers of carriers may be applied, which, if desired, may be of different types.

As regards the way of proceeding when using a plastic hardenable by heat there are several possibilities. For example, the carrier may be entirely impregnated, in which case one and the asme plastic will form both the outward, visible surface and also the binding agent, uniting the carrier and the fiber board. It is also possible to cover the carrier with a superficial layer of a plastic, which is to constitute the outward, visible surface, and to cover the fiber board with some other, cheaper plastic, uniting the carrier and the fiber board, or also, the carrier may be impregnated with two different plastics. One further possibility resides in not applying any plastic at all to the outwardly turned surface of the carrier. Hereby products can be obtained, in which the surface maintains such a degree of porosity that, for example, it will offer a good hold for paints and lacquers but yet will require considerably smaller quantities of such surfacing agents than those required in case of ordinary, hard wood fiber boards.

When using oil as an impregnating agent the polymerisation thereof takes place substantially during the hardening-on-heating of the molded body (the wood fiber board) following the pressing operation. The binding capacity of the oil after the pressing operation but prior to the hardening-on-heating operation often is not very marked and, therefore, as already mentioned it may be suitable to add to the oil a substance serving as an extra binder. The substantial purpose of such an extra binder is to prevent, temporarily, the impregnated and/or covered sheet from getting detached from the molded body (the wood fiber board) during the transportation to the hardening-on-heating operation after the pressing operation having been completed. Preferably, the extra binder consists of a sizing substance, which is either of a synthetic nature, for example, carboxy-methyl cellulose, melamine-formaldehyde resin, phenol-formaldehyde resin or urea-formaldehyde resin, thermoplastics, such as of the vinyl type or acrylate type, or of a vegetable or an animal character, such as starch, soya flour, tall oils, tall oil derivatives or casein.

Instead of using for the impregnation and/or covering of the highly flexible sheets the oil, polymerisable by heat, in a pure state it may be suitable to use an emulsion of such an oil and/or an emulsion of derivatives thereof. Hereby the special advantage is obtained that no extra binder for temporarily holding the impregnated sheet to the molded body (the fiber board) need be used. The content of oil and, respectively, of oil derivative of the emulsion may be any suitable one and be dependent on the technical application means. A content below about 40%, preferably amounting to about 25%, has proved advantageous. As an emulsifying agent there may be used water with an addition of 3–8%, preferentially 4–6%, preferably 5%, of oleic acid, a stable emulsion being then obtained.

*Example 1*

Wood fibers were caused to form a sheet by sedimentation in air after about 2% of phenol-formaldehyde resin having first been added to the fibers. Upon the fiber sheet thus obtained there was placed a sheet of newsprint, impregnated with an esterified tall oil, to which 5% of soya flour had been admixed. The applied quantity of oil amounted to about 28 g./sq. m. Prior to the pressing operation the moisture content of the fiber sheet amounted to about 10%. The pressing operation was carried out between two polished platens at a temperature of 175–180° C. The squeezing pressure was at first raised to 47 kgs./sq. cm. in 15 seconds, was kept at this level for 5 seconds and was then lowered to 11 kgs./sq. cm., where it was kept for 7 minutes. The result was a board having a surface layer of a dense structure, imparting to the board excellent properties for painting. This means that with one simple application, for example, by spray painting in one single operation, there is obtained a completely acceptable covering, even with less quantities of paint than those generally required when painting in accordance with conventional methods. Also the surface will stand moderate sandpapering, for example, for the purpose of smoothing a defect eliminated by puttying, whereupon subsequent painting will yield a result comparable to the result obtained with an unpolished surface.

*Example 2*

To a porous fiber board, which had first been dried to a moisture content of 2% and which possessed a weight per unit of volume amounting to 250 kgs./cub. m., there was applied a sheet of newsprint impregnated with an esterified tall oil, to which 5% of soya flour had been added. The applied quantity of oil amounted to about 28 gs./sq. m. The subsequent pressing operation was carried out between two polished platens at a temperature of 175–180° C. at a pressure of 65–70 kgs./sq. cm. for a time of 2.5 minutes. The result was a board having a surface layer of the same character as the one according to Example 1.

Fiber boards or similar molded bodies manufactured in accordance with the present invention on the one hand provide an increase in the flexural strength amounting to about 10% and on the other hand a considerable decrease in the capacity for absorbing water, and finally also a marked reduction in the capacity for swelling in water.

Having now described my invention, what I claim as new and desired to secure by Letters Patent is:

1. A process for the manufacture of molded bodies for joinery and building purposes which comprises forming a compressed fiber board from an original sheet of wood fiber material consisting essentially of a loosely felted fiber mat obtained by the air-sedimentation of fibers, said original sheet having a moisture content of about 2 to 10%, by subjecting said sheet of wood fiber material to the simultaneous action of heat and high pressure, uniting said sheet of wood fiber material immediately before the pressing operation with at least one thin highly flexible sheet of preformed paper having that side which is to be put into contact with the surface of said sheet of wood fiber material provided with a layer of heat-polymerisable oil applied in the form of an emulsion, said oil being at least one of the oils selected from the group consisting of linseed oil, chinawood oil, soya oil, tall oils, tall oil derivatives and castor-oil alkyds, and heating the composite compressed body thus formed to a sufficiently high temperature and for a sufficient length of time to provide a strong bond between the sheet of wood fiber material and said thin highly flexible sheet of preformed paper.

2. A process as claimed in claim 1, in which an extra binder is added to the heat-polymerizable oil prior to the application of the oil to the thin highly flexible sheet of preformed paper, said extra binder being a synthetic sizing agent selected from the group consisting of melamine-formaldehyde resin, phenol-formaldehyde resin, urea-formaldehyde resin, vinyl thermoplastics and acrylate resins.

3. A process as claimed in claim 1, in which the extra binder is a sizing agent selected from the group consisting of starch, soya flour, carboxymethyl cellulose, and casein.

4. A process as claimed in claim 1, in which the heat-polymerisable oil is present in the emulsion in an amount from about 25% to about 40%.

References Cited by the Examiner
UNITED STATES PATENTS

| | | | |
|---|---|---|---|
| 2,321,938 | 6/1943 | Quinn | 154—45.9 |
| 2,698,271 | 12/1954 | D'A. Clark | 156—373 XR |
| 2,931,750 | 4/1960 | Goms | 154—110 |
| 2,947,654 | 8/1960 | Chapman | 154—100 |

EARL M. BERGERT, *Primary Examiner.*

CARL F. KRAFFT, *Examiner.*